United States Patent
Park

(10) Patent No.: US 12,428,063 B2
(45) Date of Patent: Sep. 30, 2025

(54) VEHICLE FRONT STRUCTURE

(71) Applicants: Hyundai Motor Company, Seoul (KR); Kia Corporation, Seoul (KR)

(72) Inventor: Ji Woong Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 638 days.

(21) Appl. No.: 17/885,989

(22) Filed: Aug. 11, 2022

(65) Prior Publication Data

US 2023/0182820 A1    Jun. 15, 2023

(30) Foreign Application Priority Data

Dec. 13, 2021 (KR) .................. 10-2021-0178005

(51) Int. Cl.
*B62D 25/08* (2006.01)
*B60K 1/04* (2019.01)
*B62D 21/15* (2006.01)
*B62D 27/02* (2006.01)

(52) U.S. Cl.
CPC .............. *B62D 21/155* (2013.01); *B60K 1/04* (2013.01); *B62D 25/08* (2013.01); *B62D 27/02* (2013.01); *B62D 27/023* (2013.01); *B60K 2001/0411* (2013.01); *B60K 2001/0438* (2013.01); *B60Y 2306/01* (2013.01)

(58) Field of Classification Search
CPC .... B62D 25/08; B62D 25/2018; B62D 25/20; B62D 27/023; B62D 27/065; B62D 27/02; B62D 21/14; B62D 21/145; B62D 21/155; B60K 1/04; B60K 2001/0438; B60K 2306/01

USPC ..... 296/70, 203, 1, 2, 193.09, 187.09, 187.1
See application file for complete search history.

(56) References Cited

U.S. PATENT DOCUMENTS

| | | | |
|---|---|---|---|
| 6,398,292 B2 * | 6/2002 | Tsuruta | B62D 39/00 296/68.1 |
| 9,376,143 B2 | 6/2016 | Alavandi et al. | |
| 9,975,528 B2 * | 5/2018 | Mashiki | B60T 7/065 |
| 11,673,609 B2 * | 6/2023 | Anzai | B62D 25/082 280/784 |
| 2017/0291642 A1 | 10/2017 | Nusier et al. | |

FOREIGN PATENT DOCUMENTS

| | | |
|---|---|---|
| EP | 2987705 A1 | 2/2016 |
| JP | 2012153208 A | 8/2012 |
| KR | 930025509 U | 12/1993 |
| KR | 20110103706 A | 9/2011 |
| KR | 101690235 B1 | 12/2016 |

* cited by examiner

*Primary Examiner* — Dennis H Pedder
(74) *Attorney, Agent, or Firm* — Slater Matsil, LLP

(57) ABSTRACT

An embodiment vehicle front structure including a front subframe disposed in a lower portion of a front compartment of a vehicle, the front subframe configured to support one or more front components, a guide member attached to a lower portion of a dash panel, the dash panel dividing the front compartment and a passenger compartment, and the guide member including an inclined wall that is inclined downwardly toward a bottom of the vehicle, a floor connected to the dash panel, and a battery disposed under the floor, wherein the guide member is located in front of the battery.

20 Claims, 7 Drawing Sheets

VEHICLE FRONT STRUCTURE

CROSS-REFERENCE TO RELATED APPLICATIONS

This application claims the benefit of Korean Patent Application No. 10-2021-0178005, filed on Dec. 13, 2021, which application is hereby incorporated herein by reference.

TECHNICAL FIELD

The present disclosure relates to a vehicle front structure.

BACKGROUND

In general, a vehicle includes a body and a chassis. The chassis is a frame on which an engine, a powertrain, a steering system, a brake system, and a suspension system are mounted. The body includes a main body, an exterior body, and an interior body.

The chassis includes a main frame and a subframe. The subframe includes a front subframe disposed below a front portion of the body, and a rear subframe disposed below a rear portion of the body. The front subframe may support front components (an engine, a transmission, an electric motor, a gearbox, etc.), and may serve to facilitate the transfer of a load while ensuring structural stiffness of the vehicle. It may be desirable to mount the front subframe to ensure the basic performance of the vehicle such as crashworthiness, noise, vibration, and harshness (NVH), and ride and handling (R&H).

The vehicle may include a front compartment and a passenger compartment which are divided by a dash panel, and the front components may be disposed in the front compartment.

An electric vehicle may include a battery disposed under a floor, and an electric motor, a gearbox, and the like may be disposed in the front compartment.

Next-generation electric vehicles tend to increase the space of the passenger compartment in order to implement autonomous driving and innovative UX, and accordingly the space of the front compartment may be relatively reduced.

When the space of the front compartment is reduced, a space for absorbing impact energy in a frontal collision may also be reduced. Accordingly, the front subframe and the front compartment may directly collide with a front end of the battery during the frontal collision, which may result in the risk of fire due to damage to the battery.

The above information described in this background section is provided to assist in understanding the background of the inventive concept, and may include any technical concept which is not considered as the prior art that is already known to those skilled in the art.

SUMMARY

The present disclosure relates to a vehicle front structure. Particular embodiments relate to a vehicle front structure configured to convert impact energy generated in a frontal collision into kinetic energy.

Embodiments of the present disclosure can solve problems occurring in the prior art while advantages achieved by the prior art are maintained intact.

An embodiment of the present disclosure provides a vehicle front structure configured to convert impact energy generated in a frontal collision into kinetic energy, thereby minimizing a space for absorbing the impact energy in a front compartment of the vehicle.

According to an embodiment of the present disclosure, a vehicle front structure may include a front subframe disposed in a lower portion of a front compartment of a vehicle, and supporting at least one front component, a guide member attached to a lower portion of a dash panel by which the front compartment and a passenger compartment are divided, and including an inclined wall which is inclined downwardly toward the bottom of the vehicle, a floor connected to the dash panel, and a battery disposed under the floor. The guide member may be located in front of the battery.

As the guide member having the inclined wall is located in front of the battery, the front subframe and the front component may move toward the bottom of the vehicle along the inclined wall of the guide member during a frontal collision of the vehicle, and thus the front subframe and the front component may be prevented from colliding with a front end of the battery.

The guide member may be directly attached to the front end of the battery.

As the guide member is directly attached to the front end of the battery, the front end of the battery may be more safely protected by the guide member from an external impact/collision.

The vehicle front structure may further include a mounting bracket attached to the lower portion of the dash panel, and the guide member may be mounted on the mounting bracket through a fastener.

As the guide member is mounted on the lower portion of the dash panel through the mounting bracket, the guide member may be firmly supported to the dash panel of the vehicle body.

The guide member together with a rear mount of the front subframe may be joined to the mounting bracket through a first bolt.

As the guide member together with the rear mount of the front subframe is joined to the mounting bracket, the guide member and the rear mount of the front subframe may be firmly supported to the dash panel of the vehicle body.

The guide member may have an upper cavity in which the rear mount of the front subframe is received.

As the rear mount of the front subframe is received in the upper cavity of the guide member, the guide member and the rear mount of the front subframe may be more stably mounted on the mounting bracket.

A central portion of the guide member together with a rear mount of the front subframe may be joined to the mounting bracket through a first bolt, and each edge of the guide member may be joined to the mounting bracket through a second bolt.

Accordingly, the rear mount of the front subframe may be joined to the mounting bracket through the guide member so that rear mounting stiffness of the front subframe may be improved, and the guide member may be joined to the mounting bracket through the first bolt and the second bolt so that mounting stiffness of the guide member may be improved.

The guide member may extend in a transverse direction of the vehicle, and the guide member may have the same cross section in the transverse direction of the vehicle.

The guide member may be an extruded product manufactured by an extrusion process. As the guide member is manufactured by an extrusion process, the manufacturing cost thereof may be reduced and the quality thereof may be improved.

The battery may have a high voltage connector provided on a front portion thereof, and two guide members may be symmetrically disposed on both sides of the high voltage connector.

In the event of a frontal collision of the vehicle, the two guide members may protect the high voltage connector of the battery more safely, and the front subframe and the front component may move along the inclined walls of the two guide members in a balanced manner. In particular, the front subframe and the front component may avoid colliding with the high voltage connector of the battery.

The guide member may further include a top wall, a front wall extending from a front end of the top wall, a rear inclined wall extending obliquely from a rear end of the top wall, and a rear wall extending from the rear inclined wall, and the inclined wall may extend obliquely from a bottom end of the front wall to a bottom end of the rear wall.

The guide member may include an internal cavity defined therein, and the guide member may further include a plurality of inner ribs provided in the internal cavity.

The plurality of inner ribs may be spaced apart from each other in a height direction of the guide member, and each inner rib may extend in a longitudinal direction of the vehicle.

The guide member may further include a projection protruding toward the dash panel.

The projection may include an inner rib provided therein, and a plurality of cavities divided by the inner rib.

Accordingly, in the event of a frontal collision of the vehicle, a load transferred to the guide member may be transferred to a dash cross lower member ahead of the battery. Thus, the position of the guide member may be properly regulated against the impact load by the projection. In particular, the guide member may be prevented from rotating counterclockwise and being deformed by the impact load. That is, when the impact load is applied to the guide member, the position of the guide member may be stably kept by the projection.

According to another embodiment of the present disclosure, a vehicle front structure may include a pair of front side members, a front crossmember connecting the pair of front side members, a front subframe disposed below the front crossmember and supporting a front component, and a guide member attached to a lower portion of a dash panel by which a front compartment and a passenger compartment are divided, and including an inclined wall which is inclined downwardly toward the bottom of the vehicle. The front crossmember may be adjacent to an upper portion of the front component, and the front crossmember may be located higher than a center of gravity of the front component.

The front crossmember may be spaced apart from the center of gravity of the front component by a predetermined distance. During a frontal collision of the vehicle, as impact energy may be transferred to the front crossmember, the front crossmember may collide with the upper portion of the front component. As the front crossmember collides with the upper portion of the front component during the frontal collision of the vehicle, a reaction force caused by the front crossmember may act from the upper portion of the front component to the rear of the vehicle, and an inertial force of the front component may act to the front of the vehicle so that the front component together with the front subframe may rotate on the center of gravity of the front component. Accordingly, the front subframe and the front component may move toward the bottom of the vehicle along the inclined wall of the guide member.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
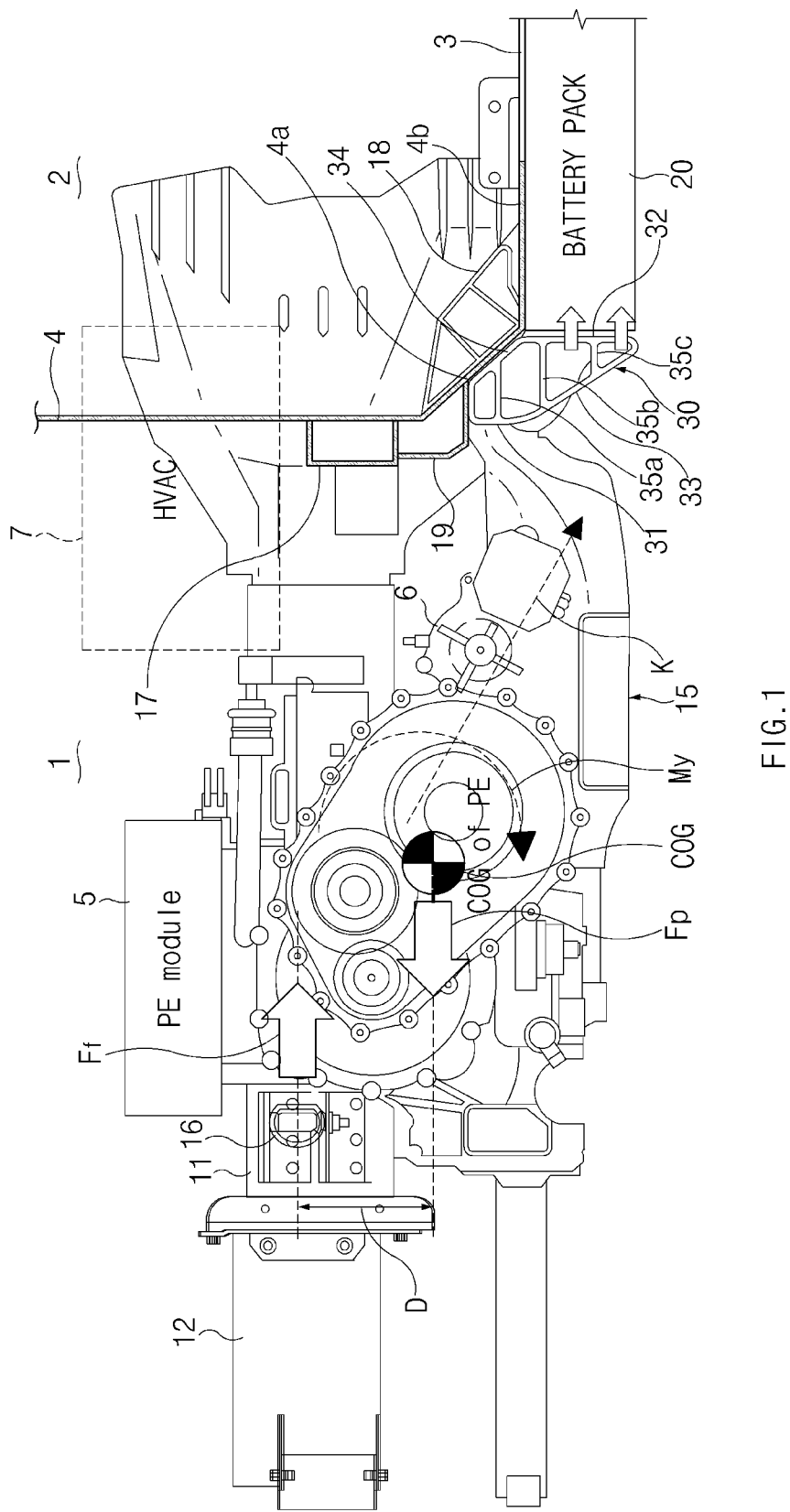
FIG. 1 illustrates a side sectional view of a vehicle front structure according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
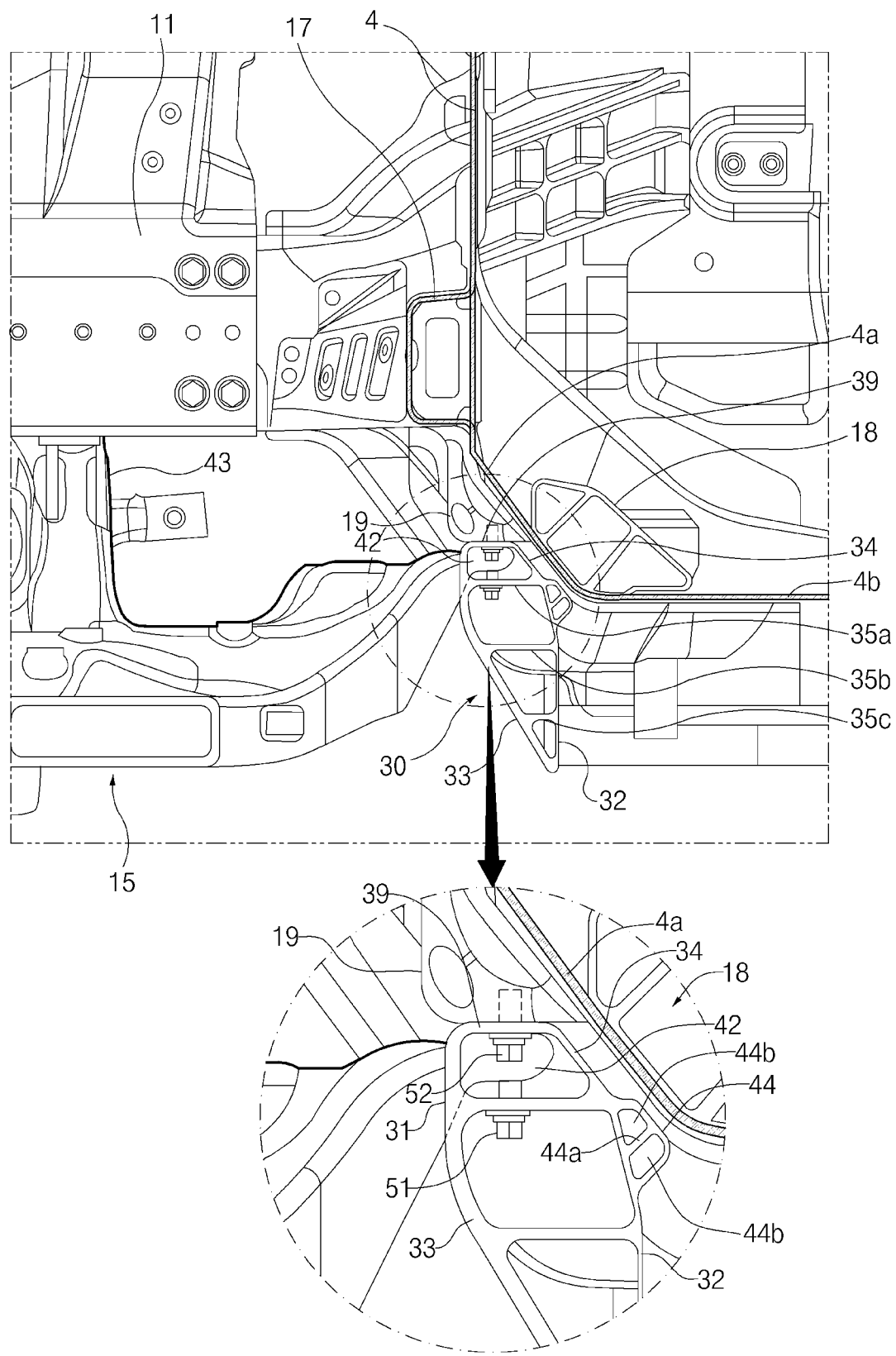
FIG. 2 illustrates an enlarged view of a rear portion of a front subframe and a guide member in the vehicle front structure illustrated in FIG. 1.

Referring to FIGS. 1 and 2, a vehicle front structure according to an exemplary embodiment of the present disclosure may include a front side member 11, a front subframe 15 disposed below the front side member 11, and a guide member 30 disposed behind the front subframe 15.

The vehicle front structure according to an exemplary embodiment of the present disclosure may include a front compartment 1 defined by a dash panel 4. Referring to FIG. 2, the dash panel 4 may be provided to separate the front compartment 1 from a passenger compartment 2. The dash panel 4 may be upright at the rear of the vehicle front structure. The dash panel 4 may include an inclined portion 4a provided on a lower portion thereof, and a bottom portion 4b extending from the inclined portion 4a toward the rear of the vehicle in a longitudinal direction of the vehicle. The inclined portion 4a may extend obliquely, and the bottom portion 4b may be joined to a front end of a floor 3 using welding, fasteners, and/or the like. A dash cross upper member 17 may be mounted on a front surface of the dash panel 4, and a dash cross lower member 18 may be mounted on a top surface of the inclined portion 4a and a top surface of the bottom portion 4b. The dash cross upper member 17 may be located higher than the dash cross lower member 18. A mounting bracket 19 may be attached to the inclined portion 4a of the dash panel 4. The inclined portion 4a of the dash panel 4 may be interposed between the mounting bracket 19 and the dash cross lower member 18. The mounting bracket 19 may be exposed to the front compartment 1 of the vehicle, and the dash cross lower member 18 may be exposed to the passenger compartment 2 of the vehicle. Accordingly, the mounting bracket 19 and the dash cross lower member 18 may face each other with the dash panel 4 interposed therebetween.

Figure 3:
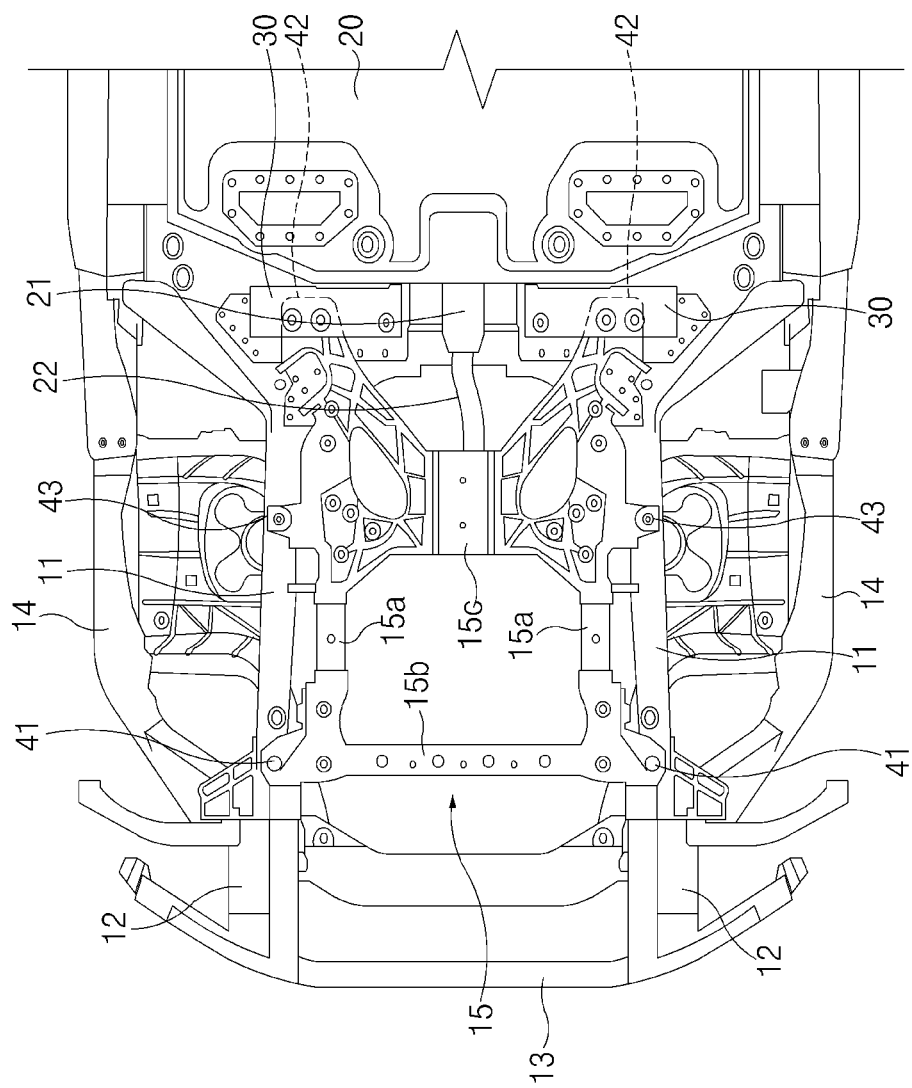
FIG. 3 illustrates a bottom view of a vehicle front structure according to an exemplary embodiment of the present disclosure.
Figure 4:
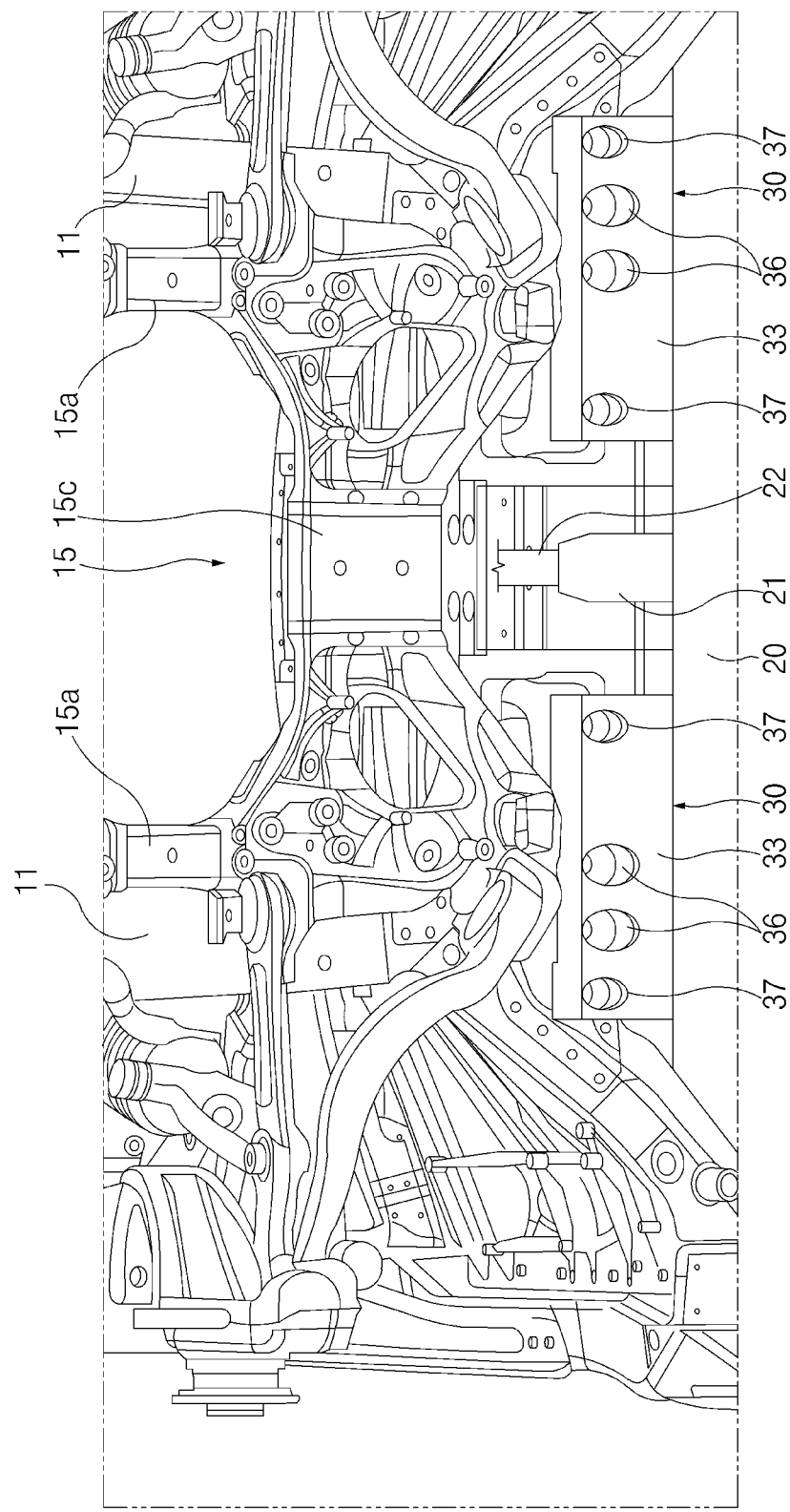
FIG. 4 illustrates a bottom view of a rear portion of a front subframe and a guide member in a vehicle front structure according to an exemplary embodiment of the present disclosure.

Referring to FIG. 1, a battery 20 may be disposed under the floor 3. Referring to FIGS. 3 and 4, a high voltage connector 21 may be disposed at the center of a front end of the battery 20, and a high voltage wire 22 may extend from the high voltage connector 21.

Referring to FIG. 3, the pair of front side members 11 may be spaced apart from each other in a transverse direction of the vehicle. Each front side member 11 may extend in the longitudinal direction of the vehicle. The pair of front side members 11 may be connected to a bumper beam 13 through a pair of crash boxes 12, and the bumper beam 13 may extend in the transverse direction of the vehicle. A pair of fender apron members 14 may be spaced apart from each other in the transverse direction of the vehicle, and each fender apron member 14 may extend from a front pillar to a front end of the corresponding front side member 11.

Figure 7:
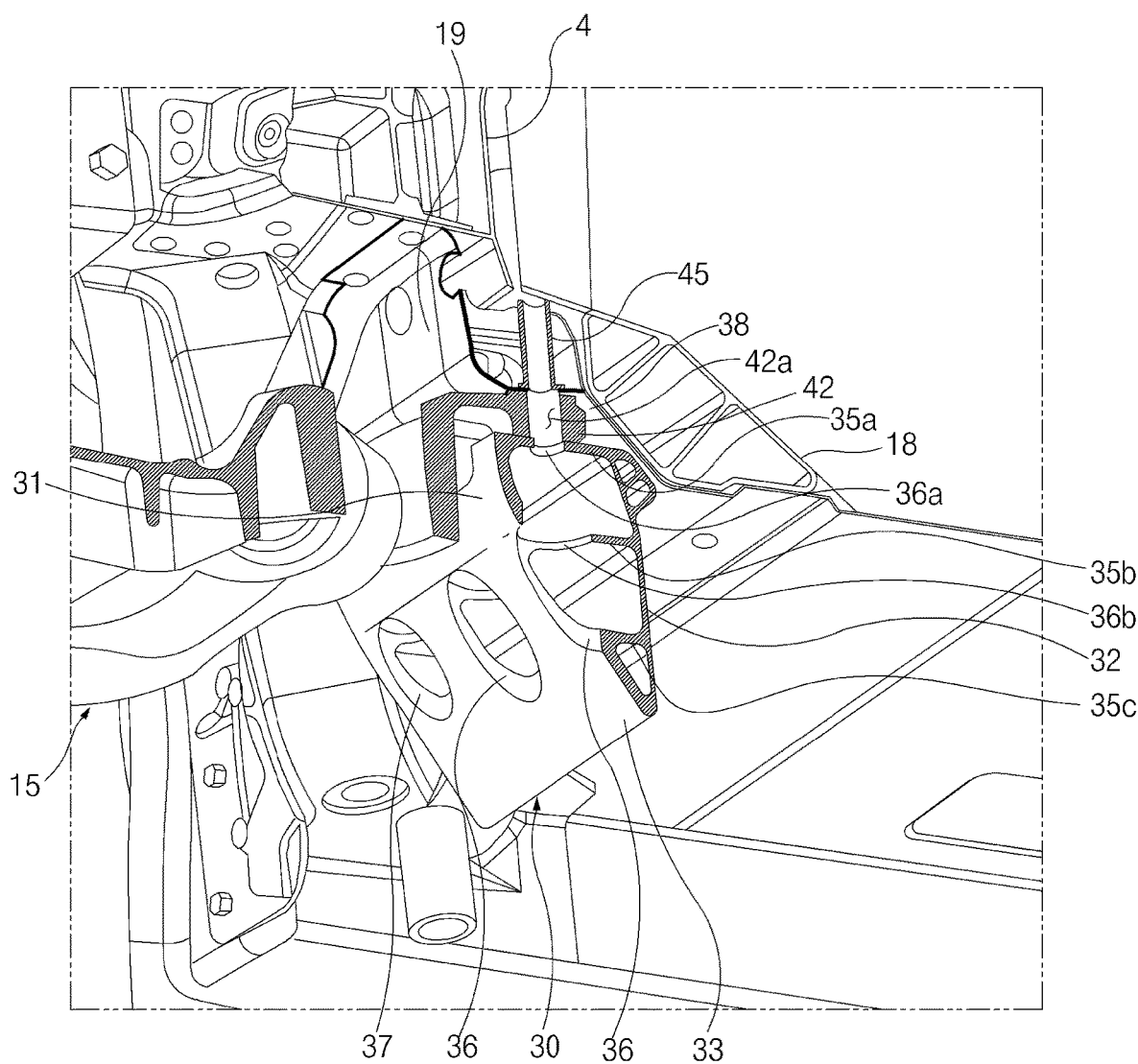
FIG. 7 illustrates a cut-away perspective view of a state in which a rear mount of a front subframe is inserted into an upper cavity of a guide member in a vehicle front structure according to an exemplary embodiment of the present disclosure.

Referring to FIG. 3, the front subframe 15 may include a pair of longitudinal members 15a, a front transverse member 15b connecting front ends of the pair of longitudinal members 15a, and a rear transverse member 15c connecting rear ends of the pair of longitudinal members 15a. The front subframe 15 may include a pair of front mounts 41 provided on a front portion thereof, a pair of rear mounts 42 provided on a rear portion thereof, and a pair of middle mounts 43 provided on a middle portion thereof. Each front mount 41 may be provided on a front portion of the corresponding longitudinal member 15a, and the front mount 41 may be mounted on a front portion of the corresponding front side member 11 through a fastener and/or the like. Each rear mount 42 may be provided on a rear portion of the corresponding longitudinal member 15a, and the rear mount 42 may be mounted on the lower portion of the dash panel 4 through the mounting bracket 19 as illustrated in FIG. 7. Each middle mount 43 may be provided on a middle portion of the corresponding longitudinal member 15a, and the middle mount 43 may be mounted on a middle portion of the corresponding front side member 11 through a fastener and/or the like.

The front subframe 15 may support various front components 5 and 6 disposed in the front compartment 1.

The vehicle front structure according to an exemplary embodiment of the present disclosure may be applied to electric vehicles. As illustrated in FIG. 1, the front components may include a power electronics (PE) module 5 and a gearbox 6. The PE module 5 may include at least one of an electric motor, an inverter, and a reducer.

The vehicle front structure according to another exemplary embodiment of the present disclosure may be applied to internal combustion engine vehicles, and the front components may include an internal combustion engine, a transmission, and the like.

Referring to FIG. 1, a heating, ventilation, and air conditioning (HVAC) housing 7 may be disposed in the front compartment 1 and the passenger compartment 2 through the dash panel 4.

Referring to FIGS. 1 and 3, a front crossmember 16 may connect the pair of front side members 11 in the transverse direction of the vehicle. The front crossmember 16 may extend in the transverse direction of the vehicle. According to an exemplary embodiment, the front crossmember 16 may be a frunk bar supporting a frunk which is a storage space provided in the front compartment.

The front crossmember 16 may be located higher than the center of gravity (COG) of the front component, and the front crossmember 16 may be aligned with an upper portion of the front component in the longitudinal direction of the vehicle. In particular, the front crossmember 16 may be spaced apart from the center of gravity (COG) of the front component by a predetermined distance D, and the distance D may be a vertical distance between the front crossmember 16 and the center of gravity of the front component. During a frontal collision of the vehicle, as impact energy is transferred to the front crossmember 16, the front crossmember 16 may collide with the upper portion of the front component. For example, during a frontal collision of the vehicle, as illustrated in FIG. 1, as the front crossmember 16 collides with the upper portion of the PE module 5, a reaction force $F_f$ caused by the front crossmember 16 may act from the upper portion of the PE module 5 to the rear of the vehicle, and an inertial force Fp of the PE module 5 may act to the front of the vehicle so that the PE module 5 together with the front subframe 15 and the gearbox 6 may rotate on the center of gravity (COG) of the PE module 5 (see arrow My in FIG. 1). Accordingly, a rotational moment My of the PE module 5, the gearbox 6, and the front subframe 15 may be determined by the reaction force $F_f$ and the distance D (My=$F_f$×D).

The guide member 30 may be mounted on the inclined portion 4a of the dash panel 4 through the mounting bracket 19. Accordingly, the guide member 30 may be firmly supported to the dash panel 4 of the vehicle body by the mounting bracket 19.

Referring to FIG. 2, the guide member 30 may include a top wall 39 attached to the mounting bracket 19, a front wall 31 facing the front of the vehicle, a rear wall 32 facing the rear of the vehicle, an inclined wall 33 extending obliquely from a bottom end of the front wall 31 to a bottom end of the rear wall 32, and a rear inclined wall 34 extending obliquely and upwardly from a top end of the rear wall 32.

The top wall 39 may be firmly joined to a bottom surface of the mounting bracket 19 using fasteners, welding, and/or the like. The top wall 39 may have a shape matching that of the bottom surface of the mounting bracket 19. For example, the bottom surface of the mounting bracket 19 may be horizontally flat, and accordingly the top wall 39 may be horizontally flat to match the bottom surface of the mounting bracket 19.

The front wall 31 may extend vertically from a front end of the top wall 39. The inclined wall 33 may be inclined from the bottom end of the front wall 31 toward the rear of the vehicle at a predetermined angle, and the inclined wall 33 may be exposed to the front of the vehicle. The rear inclined wall 34 may extend obliquely from a bottom end of the top wall 39, and the rear inclined wall 34 may face the dash panel 4. The rear inclined wall 34 may be directly attached to the inclined portion 4a of the dash panel 4. The rear wall 32 may extend vertically from a bottom end of the rear inclined wall 34.

Referring to FIG. 1, the guide member 30 may be located in front of the battery 20 in the longitudinal direction of the vehicle. In particular, the front end of the battery 20 may be covered by the rear wall 32 of the guide member 30, and accordingly the front end of the battery 20 may be safely protected by the guide member 30 from an external impact/collision.

The guide member 30 may have an internal cavity defined therein. Specifically, the internal cavity of the guide member 30 may be defined by the top wall 39, the front wall 31, the rear wall 32, the inclined wall 33, and the rear inclined wall 34. The guide member 30 may have a plurality of inner ribs 35a, 35b, and 35c provided in the internal cavity, and the internal cavity of the guide member 30 may be divided into a plurality of cavities by the plurality of inner ribs 35a, 35b, and 35c. The plurality of inner ribs 35a, 35b, and 35c may include an upper inner rib 35a adjacent to the top wall 39 of the guide member 30, a middle inner rib 35b spaced apart downwardly from the upper inner rib 35a, and a lower inner rib 35c spaced apart downwardly from the middle inner rib 35b.

According to an exemplary embodiment, the plurality of inner ribs 35a, 35b, and 35c may be parallel to each other, and each of the inner ribs 35a, 35b, and 35c may extend in the longitudinal direction of the vehicle. The plurality of inner ribs 35a, 35b, and 35c may be spaced apart from each other in a height direction of the guide member 30. As the plurality of inner ribs 35a, 35b, and 35c extend in the longitudinal direction of the vehicle, the guide member 30 may improve stiffness and/or strength in the longitudinal direction of the vehicle. During a frontal collision of the vehicle, when the rear portion of the front subframe 15 collides with the guide member 30, the guide member 30 may stably support the front subframe 15 and/or the front components (for example, the PE module 5 and the gearbox 6).

The guide member 30 may extend in the transverse direction of the vehicle, and the guide member 30 may have the same cross section in the transverse direction of the vehicle. The guide member 30 may be an extruded product manufactured by an extrusion process. As the guide member 30 is manufactured by an extrusion process, the manufacturing cost thereof may be reduced and the quality thereof may be improved.

The guide member 30 may be directly joined to the mounting bracket 19 using welding, fasteners, and/or the like. According to an exemplary embodiment, the top wall 39 of the guide member 30 may be mounted on the mounting bracket 19 through a plurality of fasteners.

Figure 5:
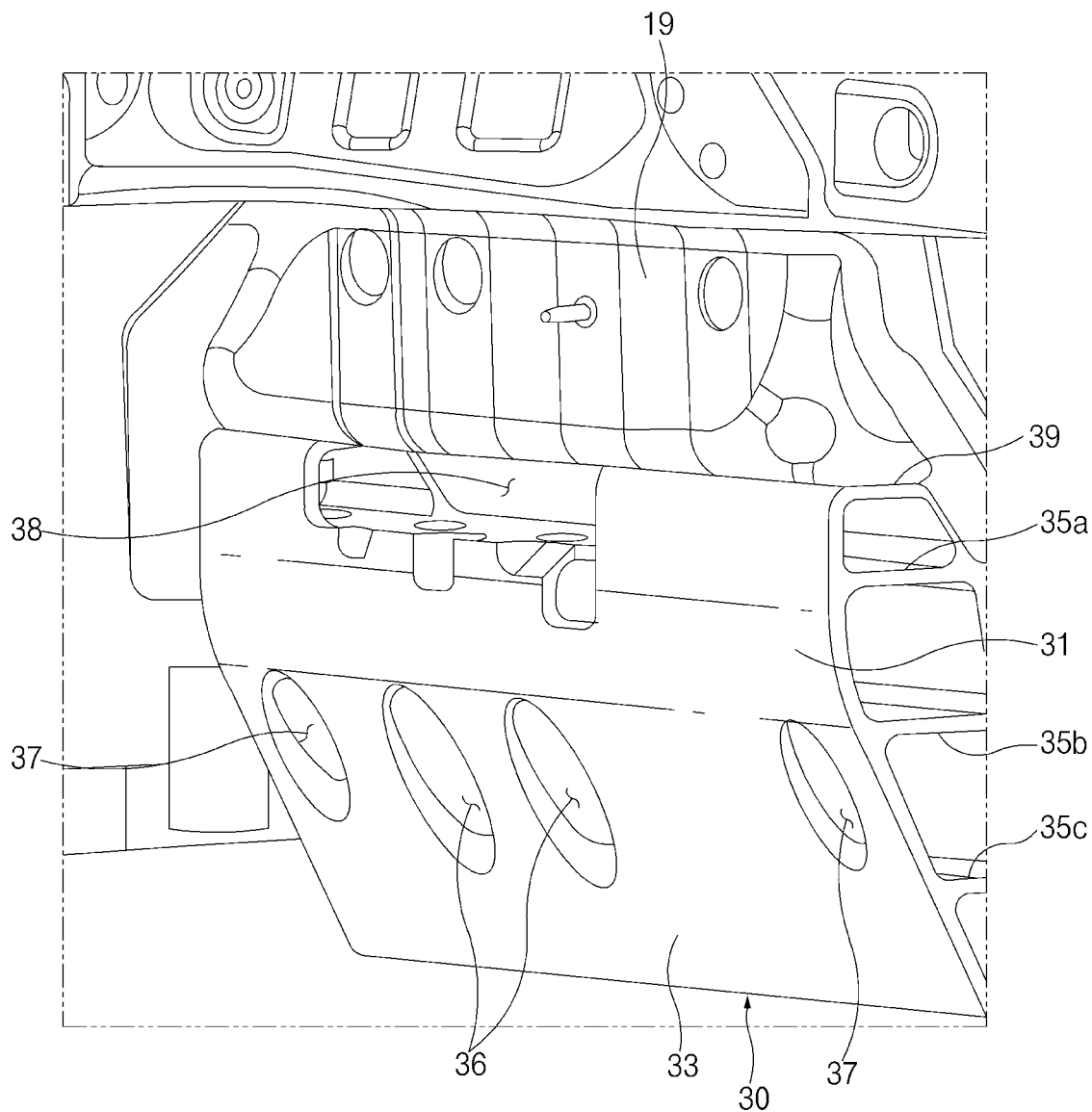
FIG. 5 illustrates a perspective view of a guide member and a mounting bracket of a vehicle front structure according to an exemplary embodiment of the present disclosure.
Figure 6:
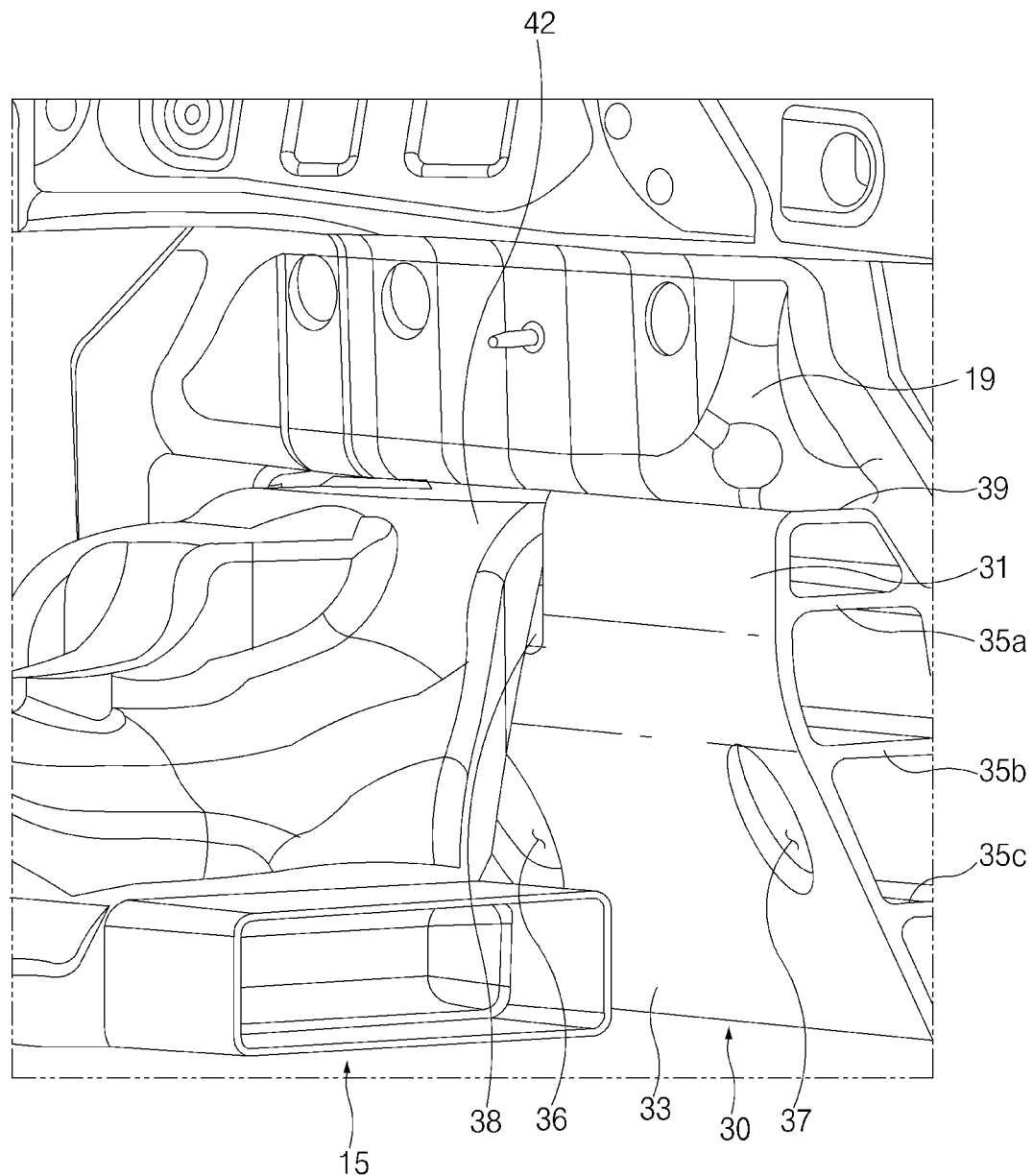
FIG. 6 illustrates a state in which a rear mount of a front subframe is inserted into an upper cavity of a guide member in a vehicle front structure according to an exemplary embodiment of the present disclosure.

Referring to FIG. 5, the guide member 30 may have an upper cavity 38 in which the rear mount 42 of the front subframe 15 is received. In a state in which the rear mount 42 of the front subframe 15 is received in the upper cavity 38 of the guide member 30, the rear mount 42 of the front subframe 15 together with the guide member 30 may be joined to the mounting bracket 19 through a first bolt 51. The upper cavity 38 may be formed in a central portion of the guide member 30. Referring to FIG. 7, the rear mount 42 of the front subframe 15 may be disposed in the upper cavity 38 of the guide member 30, a pipe nut 45 may be fixed to the mounting bracket 19, and the rear mount 42 may be located below the pipe nut 45. The rear mount 42 of the front subframe 15 may have a through hole 42a, and a central axis of the through hole 42a of the rear mount 42 may be aligned with a central axis of the pipe nut 45.

Referring to FIG. 4, the guide member 30 may have a first through hole 36 located below the upper cavity 38, and the first through hole 36 may be provided in the inclined wall 33. The guide member 30 may have a plurality of inner through holes 36a and 36b aligned with the first through hole 36, and the plurality of inner through holes 36a and 36b may be provided in at least some inner ribs 35a and 35b. Referring to FIG. 7, an upper inner through hole 36a may be provided in the upper inner rib 35a, and a middle inner through hole 36b may be provided in the middle inner rib 35b. The first through hole 36 may be aligned with the upper inner through hole 36a and the middle inner through hole 36b, and the upper inner through hole 36a may directly communicate with the upper cavity 38. The first bolt 51 (see FIG. 2) may be inserted into the rear mount 42 of the front subframe 15 through the first through hole 36, the upper inner through hole 36a, and the middle inner through hole 36b, and the first bolt 51 may be screwed into the pipe nut 45 through the through hole 42a of the rear mount 42 of the front subframe 15 and the inside of the pipe nut 45. In a state in which the rear mount 42 of the front subframe 15 is received in the upper cavity 38 of the guide member 30, the rear mount 42 of the front subframe 15 together with the guide member 30 may be joined to the mounting bracket 19 through the first bolt 51. The number of the first through hole 36 may correspond to the number of the through hole 42a of the rear mount 42. For example, the two first through holes 36 may be formed in the inclined wall 33 of the guide member 30 as illustrated in FIG. 4.

Referring to FIG. 4, the guide member 30 may have two second through holes 37 adjacent to both edges thereof, and the second through holes 37 may be provided in the inclined wall 33. The guide member 30 may have a plurality of inner through holes (not shown) aligned with the second through holes 37, and the plurality of inner through holes (not shown) may be provided in at least some inner ribs 35a and 35b and the top wall 39.

A second bolt 52 (see FIG. 2) may be inserted into the top wall 39 of the guide member 30 through the second through hole 37 and the plurality of inner through holes, and the second bolt 52 may be screwed into a nut (not shown) fixed to the mounting bracket 19 through the through hole of the top wall 39. Accordingly, the top wall 39 of the guide member 30 may be joined to the mounting bracket 19 through the second bolt 52.

As described above, the central portion of the guide member 30 together with the rear mount 42 of the front subframe 15 may be joined to the mounting bracket 19 through the first bolt 51, and each edge of the guide member 30 may be joined to the mounting bracket 19 through the second bolt 52. Accordingly, the rear mount 42 of the front subframe 15 may be joined to the mounting bracket 19 through the guide member 30 so that rear mounting stiffness of the front subframe 15 may be improved, and the guide member 30 may be joined to the mounting bracket 19 through the first bolt 51 and the second bolt 52 so that mounting stiffness of the guide member 30 may be improved.

Referring to FIG. 2, the guide member 30 may further include a projection 44 protruding toward the inclined portion 4*a* of the dash panel 4 and the dash cross lower member 18. The projection 44 may protrude from the rear inclined wall 34 toward the inclined portion 4*a* of the dash panel 4 and the dash cross lower member 18. In particular, the projection 44 may face the dash cross lower member 18 with the inclined portion 4*a* of the dash panel 4 interposed therebetween. The projection 44 may include at least one inner rib 44*a* provided therein, and a plurality of cavities 44*b* divided by the inner rib 44*a*. The projection 44 may directly contact the inclined portion 4*a* of the dash panel 4. Accordingly, in the event of a frontal collision of the vehicle, a load transferred to the guide member 30 may be transferred to the dash cross lower member 18 ahead of the battery 20. Thus, the position of the guide member 30 may be properly regulated against the impact load by the projection 44, the inclined portion 4*a* of the dash panel 4, and the dash cross lower member 18. In particular, the guide member 30 may be prevented from rotating counterclockwise and being deformed by the impact load. That is, when the impact load is applied to the guide member 30, the position of the guide member 30 may be stably kept by the projection 44.

During a frontal collision of the vehicle, the front subframe 15, the PE module 5, and the gearbox 6 may rotate on the center of gravity of the PE module 5, and the front subframe 15, the PE module 5, and the gearbox 6 may collide with the guide member 30. After the front subframe 15, the PE module 5, and the gearbox 6 collide with the front wall 31 of the guide member 30, they may move downward along the inclined wall 33 of the guide member 30. That is, in the event of a frontal collision of the vehicle, the inclined wall 33 of the guide member 30 may allow the front subframe 15, the PE module 5, and the gearbox 6 to move downward below the bottom of the vehicle so that the front subframe 15 and the front components 5 and 6 may be prevented from colliding with the front end of the battery 20 disposed under the floor 3. In particular, the front subframe 15 and the front components 5 and 6 may avoid colliding with the high voltage connector 21 provided on the front end of the battery 20.

Referring to FIGS. 3 and 4, two guide members 30 may be symmetrically disposed on both sides of the high voltage connector 21 of the battery 20. In the event of a frontal collision of the vehicle, the two guide members 30 may protect the high voltage connector 21 of the battery 20 more safely, and the front subframe 15 and the front components 5 and 6 may move along the inclined walls 33 of the two guide members 30 in a balanced manner. In particular, the front subframe 15 and the front components 5 and 6 may avoid colliding with the high voltage connector 21 of the battery 20.

As set forth above, according to exemplary embodiments of the present disclosure, in the event of a frontal collision of the vehicle, the guide member 30 may guide the front subframe 15 and the front components 5 and 6 to move toward the bottom of the vehicle, and thus the front subframe 15 and the front components 5 and 6 may be prevented from directly colliding with the front end of the battery 20, and the front subframe 15 and the front components 5 and 6 may be prevented from intruding into the passenger compartment.

In particular, by moving the front subframe toward the bottom of the vehicle during the frontal collision of the vehicle, the impact energy may be converted into kinetic energy. Accordingly, a space for absorbing the impact energy in the front compartment of the vehicle may be reduced, and the space of the passenger compartment may be relatively increased. In addition, the capacity of the battery may be increased.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle front structure comprising:
    a front subframe disposed in a lower portion of a front compartment of a vehicle, the front subframe configured to support one or more front components;
    a guide member attached to a lower portion of a dash panel, the dash panel dividing the front compartment and a passenger compartment, and the guide member comprising an inclined wall that is inclined downwardly toward a bottom of the vehicle;
    a floor connected to the dash panel; and
    a battery disposed under the floor, wherein the guide member is directly attached to a front end of the battery.

2. A vehicle front structure comprising:
    a front subframe disposed in a lower portion of a front compartment of a vehicle, the front subframe configured to support one or more front components;
    a guide member attached to a lower portion of a dash panel, the dash panel dividing the front compartment and a passenger compartment, and the guide member comprising an inclined wall that is inclined downwardly toward a bottom of the vehicle;
    a floor connected to the dash panel;
    a battery disposed under the floor, wherein the guide member is located in front of the battery; and
    a mounting bracket attached to the lower portion of the dash panel, wherein the guide member is mounted on the mounting bracket through a fastener.

3. The vehicle front structure according to claim 2, wherein the guide member is directly attached to a front end of the battery.

4. The vehicle front structure according to claim 2, wherein the guide member together with a rear mount of the front subframe are joined to the mounting bracket through a first bolt.

5. The vehicle front structure according to claim 4, wherein the guide member has an upper cavity in which the rear mount of the front subframe is received.

6. The vehicle front structure according to claim 2, wherein:
    a central portion of the guide member together with a rear mount of the front subframe are joined to the mounting bracket through a first bolt; and
    each edge of the guide member is joined to the mounting bracket through a second bolt.

7. The vehicle front structure according to claim 1, wherein:
    the guide member extends in a transverse direction of the vehicle; and
    the guide member has a same cross section in the transverse direction of the vehicle.

8. The vehicle front structure according to claim 1, wherein:

the battery has a high voltage connector provided on a front portion thereof; and two guide members are symmetrically disposed on both sides of the high voltage connector.

9. The vehicle front structure according to claim 1, wherein:

the guide member further comprises a top wall, a front wall extending from a front end of the top wall, a rear inclined wall extending obliquely from a rear end of the top wall, and a rear wall extending from the rear inclined wall; and the inclined wall extends obliquely from a bottom end of the front wall to a bottom end of the rear wall.

10. The vehicle front structure according to claim 1, wherein the guide member comprises:

an internal cavity defined therein; and inner ribs provided in the internal cavity.

11. The vehicle front structure according to claim 10, wherein the inner ribs are spaced apart from each other in a height direction of the guide member, each of the inner ribs extending in a longitudinal direction of the vehicle.

12. The vehicle front structure according to claim 1, wherein the guide member further comprises a projection protruding toward the dash panel.

13. The vehicle front structure according to claim 12, wherein the projection comprises an inner rib provided therein and a plurality of cavities divided by the inner rib.

14. A vehicle front structure comprising:

a pair of front side members;

a front crossmember connecting the pair of front side members;

a front subframe disposed below the front crossmember;

a front component supported by the front subframe, wherein the front crossmember is adjacent to an upper portion of the front component and is located higher than a center of gravity of the front component;

a guide member attached to a lower portion of a dash panel, the dash panel dividing a front compartment and a passenger compartment, and the guide member comprising an inclined wall that is inclined downwardly toward a bottom of a vehicle;

a floor connected to the dash panel; and a battery disposed under the floor, wherein the guide member is directly attached to a front end of the battery.

15. The vehicle front structure according to claim 14, further comprising a mounting bracket attached to a lower portion of the dash panel, wherein the guide member is mounted on the mounting bracket through a fastener.

16. The vehicle front structure according to claim 14, wherein:

the guide member extends in a transverse direction of the vehicle; and the guide member has a same cross section in the transverse direction of the vehicle.

17. The vehicle front structure according to claim 14, wherein:

the battery has a high voltage connector provided on a front portion thereof; and two guide members are symmetrically disposed on both sides of the high voltage connector.

18. The vehicle front structure according to claim 14, wherein:

the guide member further comprises a top wall, a front wall extending from a front end of the top wall, a rear inclined wall extending obliquely from a rear end of the top wall, and a rear wall extending from the rear inclined wall; and the inclined wall extends obliquely from a bottom end of the front wall to a bottom end of the rear wall.

19. The vehicle front structure according to claim 14, wherein the guide member comprises:

an internal cavity defined therein; and inner ribs provided in the internal cavity, wherein the inner ribs are spaced apart from each other in a height direction of the guide member, each of the inner ribs extending in a longitudinal direction of the vehicle.

20. The vehicle front structure according to claim 2, wherein:

the guide member extends in a transverse direction of the vehicle; and the guide member has a same cross section in the transverse direction of the vehicle.

* * * * *